US008044928B2

(12) United States Patent
Asbury et al.

(10) Patent No.: US 8,044,928 B2
(45) Date of Patent: Oct. 25, 2011

(54) METHOD FOR PAIRING 1-WAY DEVICES

(75) Inventors: Ray Asbury, Eagle, ID (US); Ryan Winfield Woodings, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 990 days.

(21) Appl. No.: 11/240,936

(22) Filed: Sep. 29, 2005

(65) Prior Publication Data

US 2007/0070035 A1  Mar. 29, 2007

(51) Int. Cl.
*G09G 5/00*  (2006.01)
(52) U.S. Cl. ........ 345/156; 345/158; 345/161; 345/163; 345/164; 345/165; 345/166; 345/168; 345/175; 455/41.1; 455/41.2; 455/41.3
(58) Field of Classification Search .......... 345/156–179; 455/41.1–41.3
See application file for complete search history.

(56) References Cited

U.S. PATENT DOCUMENTS

| 5,339,095 | A  | * | 8/1994  | Redford .................. 345/158 |
| 5,854,621 | A  | * | 12/1998 | Junod et al. ............. 345/158 |
| 5,881,366 | A  | * | 3/1999  | Bodenmann et al. ...... 455/41.2 |
| 6,473,070 | B2 | * | 10/2002 | Mishra et al. ............ 345/158 |
| 7,436,965 | B2 | * | 10/2008 | Sherman ................. 380/278 |
| 2004/0015625 | A1 | * | 1/2004 | Ayatsuka et al. ........... 710/62 |
| 2004/0233168 | A1 | * | 11/2004 | Christenson ............. 345/163 |
| 2005/0243059 | A1 | * | 11/2005 | Morris et al. ............. 345/158 |
| 2006/0125806 | A1 | * | 6/2006  | Voyles et al. ............. 345/184 |
| 2006/0132433 | A1 | * | 6/2006  | Kramer et al. ............ 345/156 |

OTHER PUBLICATIONS

A3211 and A3212 Micropower, Ultra-Sensitive Hal-Effect Switches, Allegro Microsystems, Inc., A3211-DS, Rev. 1, Copyright © 2002, 2003, 2004, 2005 Allegro Microsystems, Inc., 15 pages.

* cited by examiner

*Primary Examiner* — Richard Hjerpe
*Assistant Examiner* — Saifeldin Elnafia

(57) ABSTRACT

Disclosed is a peripheral device, comprising a sensor to trip when in proximity to a host device, and a transmitter coupled to the sensor to transmit a bind request to a host device. Further described is a method of binding the peripheral device to a host device.

21 Claims, 7 Drawing Sheets

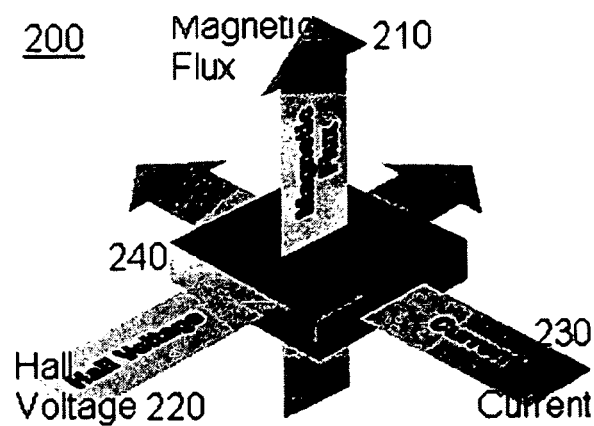
Figure 2.a
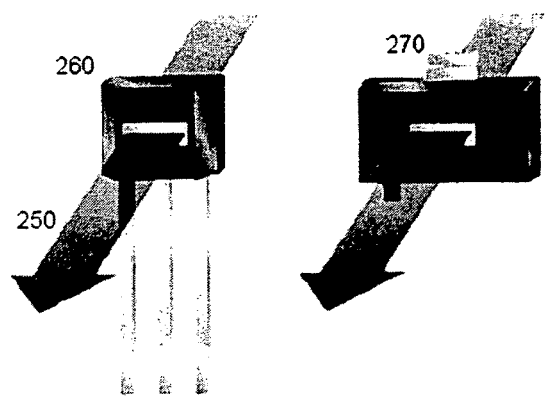
Figure 2.b
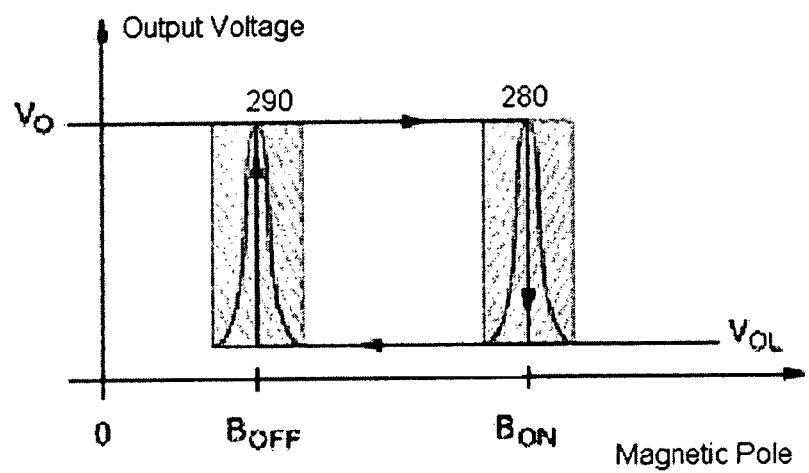
Figure 2.c

METHOD FOR PAIRING 1-WAY DEVICES

TECHNICAL FIELD

The present invention relates generally to electronic circuits, and in particular to circuits for wireless devices.

BACKGROUND

Wireless technology is widely used to enable communication from and between electronic devices. Wireless connectivity allows greater mobility, convenience, and ease of use for many users. Many low-cost PC peripherals, such as keyboard and mice use one-way transmitters in the peripheral in order to reduce cost, as two-way connectivity is more expensive.

In order to allow devices to be co-located the radio frequency band is split into multiple channels; this allows multiple devices to be in the same physical space, but requires that each wireless host PC know which channel an "attached" wireless peripheral is using so that for example, a first user's keyboard does not accidentally send keystrokes to a second user's computer.

FIG. 1 illustrates a conventional wireless system having a peripheral device with a one-way transmitter. Conventional system 100 includes a host system 110 having a host bind button 120, and a transmit-only wireless peripheral 130 having a peripheral bind button 140. In the conventional system 100, to create a "virtual cable" connection between the conventional transmit-only wireless peripheral 130 and the wireless host 110 (in one embodiment a personal computer) the user must press a button 140 on the wireless peripheral 130 and a button 120 on or attached to the wireless host 110. The conventional wireless peripheral 130 then transmits a special pairing message on its chosen channel. The wireless host 110 scans all channels to find the pairing message from the peripheral 130 in order to determine which channel the transmitter is using. In one example of the conventional system 100, the button is attached to the wireless host 110 by a Universal Serial Bus (USB) port, a serial port, a ps2 connector, or an IEEE 1394 (Firewire) port. In another example, the button 120 on the wireless host might have to be pressed before the button 140 on the wireless peripheral. If the peripheral device fails to bind because the channel is busy, then the user just repeats the bind procedure.

The conventional pairing button method assumes that no other devices will be in the special pairing mode at the same time. Disadvantages of the conventional pairing button method include that the buttons required for this method add cost to the wireless host and the wireless peripheral. The buttons are usually placed out of the way so that they are not accidentally pressed, but this may cause customer frustration if the user cannot find the buttons when the user desires to pair the devices. In an exemplary conventional wireless keyboard device (a Micro Innovations 27 MHz keyboard) the bind button is hidden on the back of the keyboard under a leg and is so small that a pen or other sharp object is required to press the button It would be desirable to have a solution that allows a simple binding method for one-way wireless transmitters.

BRIEF DESCRIPTION OF THE DRAWINGS

FIG. 2 illustrates the operation of Hall Effect in one embodiment of an electronic circuit.

DETAILED DESCRIPTION

Figure 1:
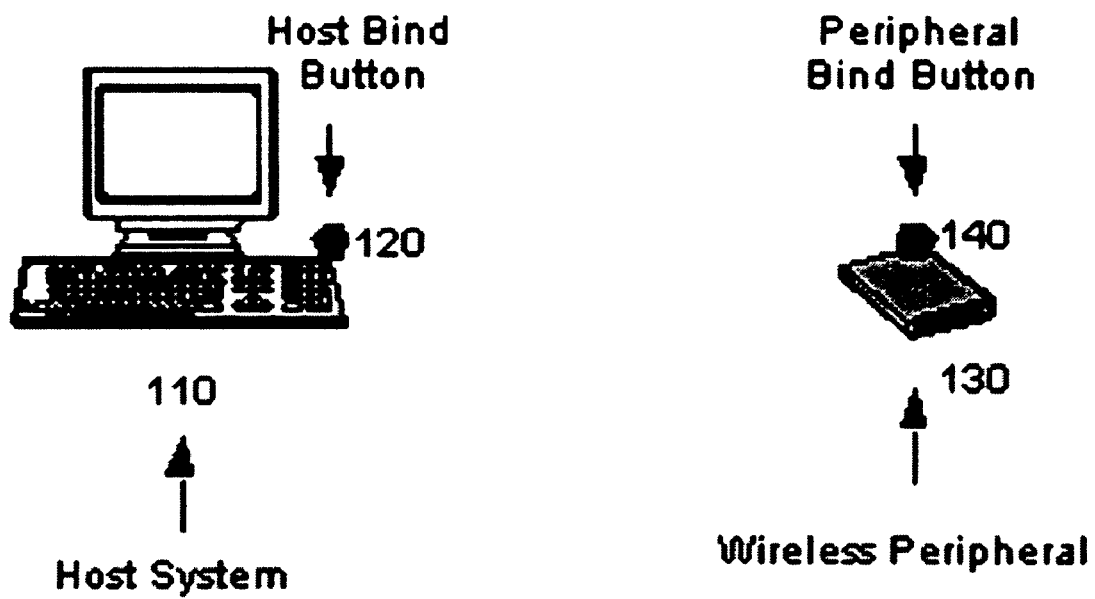
FIG. 1 illustrates a conventional wireless system having a peripheral device with a one-way transmitter.

An embodiment is described for an improved wireless bind apparatus and method.

FIG. 2a shows the operation of the Hall Effect on a semiconductor system. In a system 200, a semiconductor platelet 240 having a current 230 flowing through it is subjected to a magnetic flux 210. This magnetic flux acts perpendicularly (at 90 degree angle) to the current flow, and results in a Hall voltage 220 at a 90 degree angle to both the magnetic flux 210 and the current 230. FIG. 2b shows where a magnetic flux component 250 perpendicular to the chip surface 270 is measured. The chip surface 270 is encapsulated inside the package 260. FIG. 2c shows a graph of output voltage (vertical axis) versus magnetic pole location (horizontal axis) in the package 240. The output voltage turns low (position 280 on the graph) when the magnetic south pole is on the branded side of the package. The output voltage (position 290 on the graph) turns high if the magnetic field is removed. The sensor chip 270 does not respond to a magnetic north pole on the branded side of package 260. Other Hall-effect sensor chips which pole independent and so respond to either a magnetic north pole or a magnetic south pole could also be utilized with this invention, one such devise is the Allegro A3211 device, from AllegroMicroSystems, Inc. of Worcester, Mass.

Figure 3:
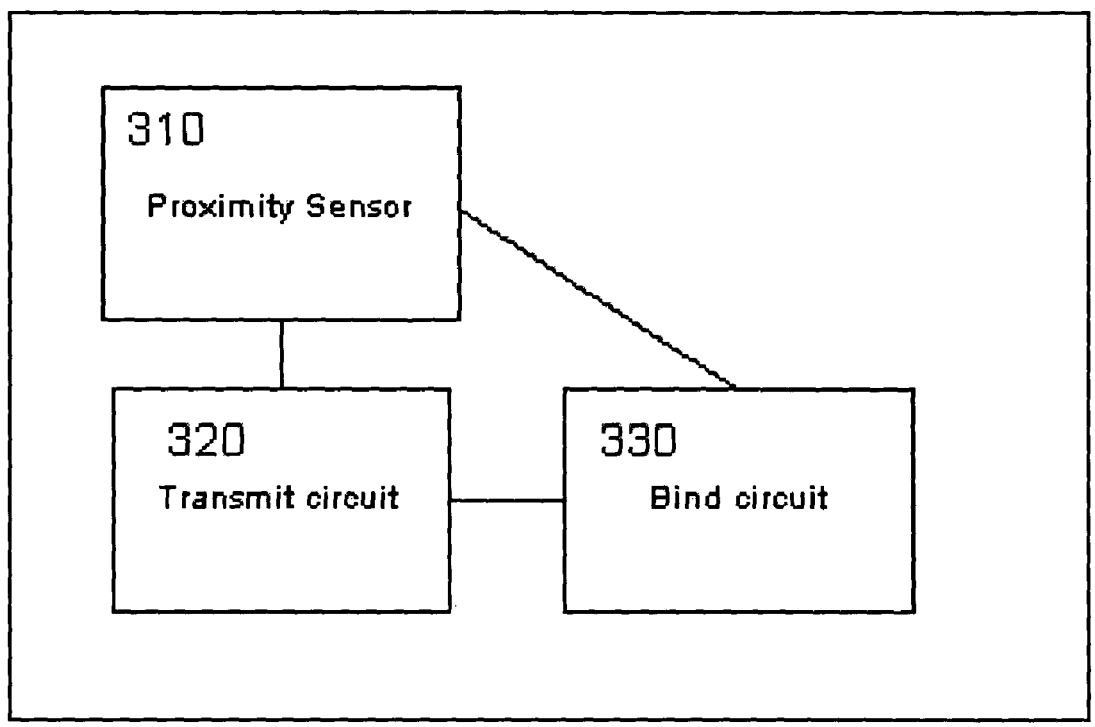
FIG. 3 illustrates one embodiment of a wireless peripheral having a one-way transmit circuit and a proximity sensor.

FIG. 3 shows a wireless peripheral device 300, for use with an improved wireless bind system and method. The wireless peripheral device 300 comprises a proximity sensor 310 coupled to a transmit circuit 320. The wireless peripheral device 300 may further comprise a bind circuit 330 coupled to proximity sensor 310 and transmit circuit 320. In one embodiment the proximity sensor 310 is a magnetic sensor, such as a semiconductor hall effect sensor or a mechanical sensor like a reed switch. In another embodiment the proximity sensor 310 may be a electrical field sensor, which triggers when placed in proximity to an electrical field. In another embodiment, the proximity sensor 310 could be an optical switch that triggers when light shines or reflects on the sensor. The wireless device 300 may be configured to trigger the proximity sensor 310 on receiving light of a certain frequency, or on receiving a certain pattern (pulses) of light on the sensor. In another embodiment, the proximity sensor 310 may trigger when in the presence of an audio frequency or wave of a certain frequency or frequency range. In one embodiment, this audio frequency may be above or below the threshold of human hearing.

The wireless peripheral device 300 may be a peripheral such as camera, a sensor for sensing one or more of an electrical field, a current, a capacitance, a light intensity, a visual image, a temperature, a pressure, a weight or any other physical or electrical property. The sensor may also be a debit/credit/payment/identification card reader, a bar code reader, a smart chip reader, a RFID tag reader or one of many other one-way (transmit only) devices. The wireless peripheral device 300 may be a human interface device such as a mouse, a keyboard, a joystick, a touchpad, a microphone, a musical instrument or pickup, a game controller, a visual input device (camera or motion recognition), a steering wheel controller, eye motion input device, or other input device.

In one embodiment, the wireless communication device 300 comprises a proximity sensor 310 configurable to detect a proximity to another wireless device 400. In one embodiment the proximity sensor 310 may detect when another wireless device 400 is within a range of 3 inches. In another embodiment the proximity sensor 310 may detect when another wireless device 400 is within a range of 12 inches. In another embodiment the proximity sensor 310 may detect when another wireless device 400 is within a range of 48 inches.

The wireless communication device 300 may further comprise a bind circuit 330 configurable to initiate a bind operation; and a transmit circuit 320 configurable to transmit bind signals to another wireless device 400. The bind circuit 330 may further comprise logic controlling a power of the output from transmit block 320. The bind logic 330 may further comprise logic controlling a number of channels on which bind signals are transmitted. The bind circuit 330 may further comprise pseudorandom number (PN) logic controlling a number of PN codes transmitted in the bind signals. The PN codes are just another way to divide the available frequencies and bandwidth. To prevent false tripping, the bind circuit may commence a bind operation on detection a signature of magnetic or electrical pulses or patterns.

Figure 4:
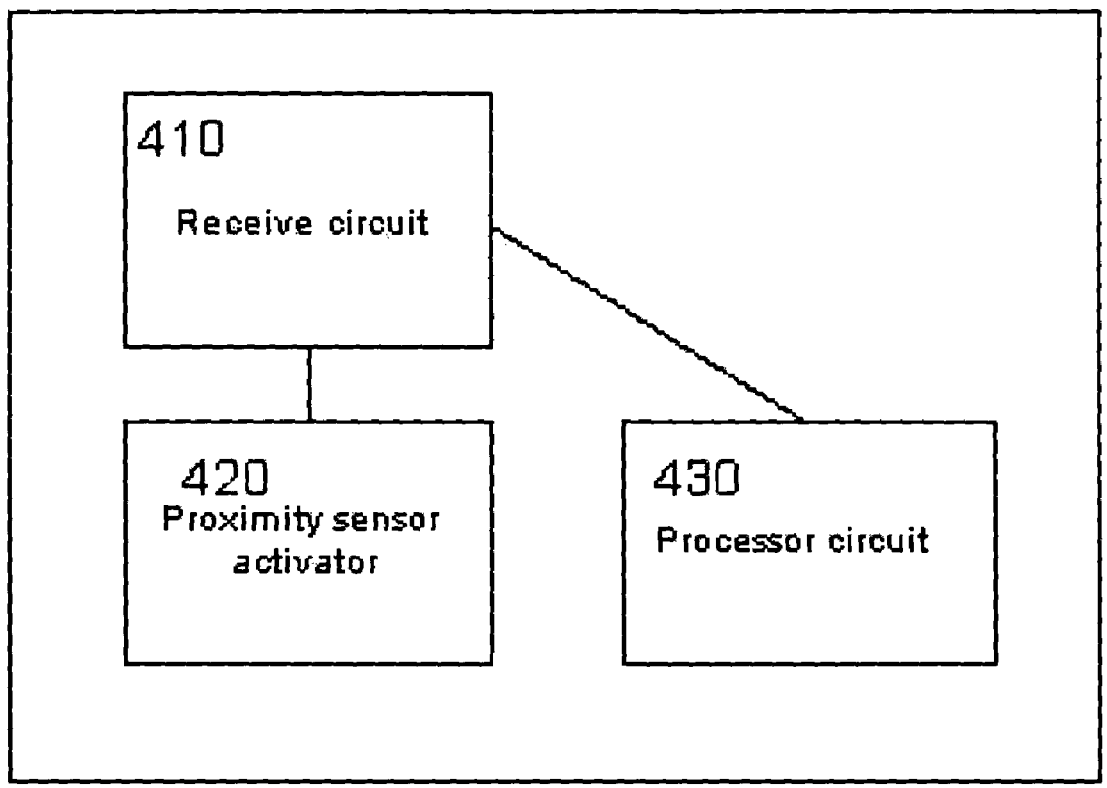
FIG. 4 illustrates one embodiment of a wireless host having a proximity sensor activator and a receive circuit.

FIG. 4 shows a wireless host device 400 for use with an improved wireless bind system and method. The wireless host device 400 comprises a receive circuit 410 coupled to a proximity sensor activator 420. The receive circuit is configurable to receive wireless communications from a peripheral device 300. The proximity sensor activator 420 is configurable to cause a sensor 310 to trip when the sensor is in proximity to the host device 400.

In one embodiment the proximity sensor activator 420 has a magnetic field. The proximity sensor activator may comprise a dedicated magnet or magnetic strip, or a magnetic field generated by a monitor or speaker or other electromagnetic device associated with the wireless host device 400. In another embodiment, the proximity sensor activator 420 may comprise an electrical field generator, which causes a proximity sensor 310 to trigger when placed in proximity to an electrical field. In another embodiment, the proximity sensor activator 420 could be an optical source that causes a proximity sensor 310 of the peripheral device to trigger when light from the sensor activator 420 shines or reflects on the sensor 310. The proximity sensor activator 420 may be configured to generate light of a certain frequency, or to generate a certain pattern (pulses) of light, or a combination thereof. In another embodiment, the proximity sensor activator 420 may generate an audio frequency or wave of a certain frequency or frequency range. In one embodiment, this audio frequency may be above the threshold of human hearing. The wireless peripheral device 400 may further comprise a processor circuit 430.

The wireless host device 400 may be a personal computer (PC), server, workstation, laptop, cellphone, personal digital assistant (PDA), games console, media playback or display device, communications or network device, security control device, industrial control device, automotive interface or control device, or other host device with which a peripheral may be used. The proximity sensor activator 420 may in one embodiment be located inside the wireless host device 400.

The improved solution comprising the wireless peripheral device 300 and the wireless host device 400 operate in the following manner. When the wireless peripheral device 300 is placed in close proximity to the wireless host device 400 (which in one embodiment contains a magnet), the switch proximity sensor 310 in the peripheral 300 (in one embodiment comprising a hall effect sensor or a magnetic reed switch or other form of magnetic switch) opens signaling the peripheral 300 to enter pairing mode. Upon entering pairing mode the peripheral 300 may optionally reduce transmit power from the transmit circuit 320, which reduces the communication range to the area immediately surrounding the peripheral 300 ensuring that the peripheral 300 will not pair with another host that is within normal communication range, but is not the desired host. The peripheral 300 then transmits a pairing mode request message on one or more channels, and may repeat this message on one or more channels a plurality of times. The pairing mode (bind) request message contains information concerning the channel to use for data communication and any other necessary information to allow the peripheral to communicate with the host such as encryption key, checksum seed, or similar key. When the host 400 receives this message it changes to the predetermined pairing channel and reduces its received sensitivity in order to guarantee that it does not accidentally receive data from an unwanted peripheral. The peripheral 300 then transmits a pairing message (multiple times to guarantee that the host has received the message) on the pairing channel that contains information about the channel the peripheral will use. When the host 400 receives this message it moves to the new channel and is able to receive data from the peripheral 300.

Figure 5:
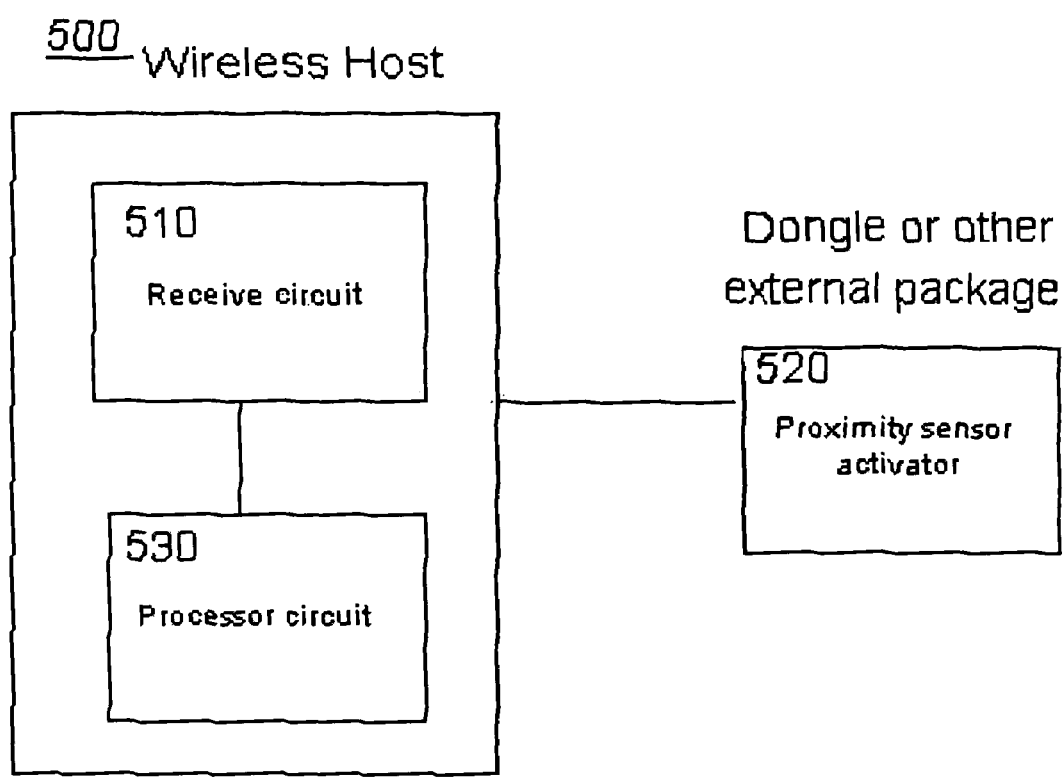
FIG. 5 illustrates one embodiment of a wireless host having a proximity sensor activator external to the host.

FIG. 5 shows a wireless host 500 having a proximity sensor activator 520 external to the wireless host 500. In one embodiment the proximity sensor activator 520 is in a 'dongle' device attached to the wireless host device. In another embodiment the proximity sensor activator may be located in the vicinity of the host device (e.g. in or on a desk where the host device is located). The proximity sensor activator 520 may comprise a monitor or a speaker device usually associated with the host. In another embodiment the proximity sensor activator 520 may comprise a magnetic strip or button or element that is provided with the wireless peripheral device, and which is intended to be placed by the user in a location proximate to the wireless host, or wherever else is convenient for binding to the host. The desired proximity range will vary depending on the specific application and may not require reduction in the receive sensitivity on the wireless host or wireless peripheral device. The maximum allowed bind range may be up to maximum transmit/receive range of the transmit circuit.

In an alternate embodiment, the binding process could be initiated not through a proximity sensor, but rather by a touch sensor on the peripheral that is activated when touched against an electrical connector or pad on the host device.

Figure 6:
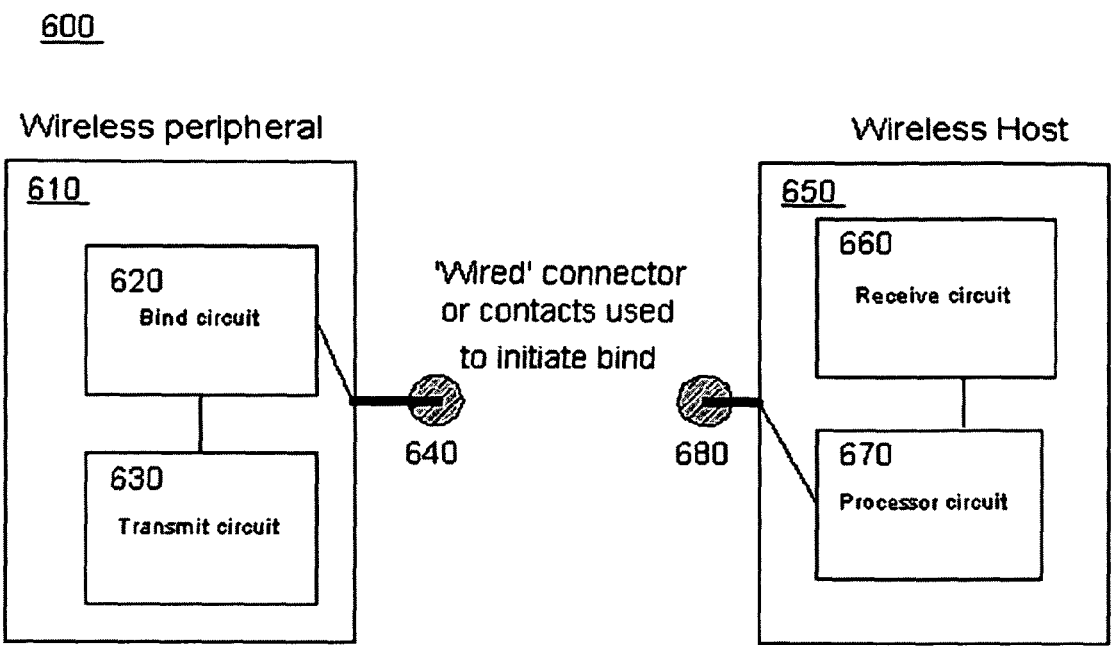
FIG. 6 illustrates one embodiment of a system having a wireless host and wireless peripheral each having a connector or contact for initiating a bind operation.

FIG. 6 illustrates an alternative embodiment of a binding system 600 having a wireless peripheral 610 and wireless host 650 each having a connector or contact for initiating a bind operation. The wireless peripheral 610 comprises a bind circuit 620, a transmit circuit 630, and a first connector or contact 640. The wireless host 650 comprises a receive circuit 660, a processor 670, and a second connector or contact 680.

The connector or contact 640 (on the wireless peripheral 610) may be conductive, so that when it is touched against a corresponding connector or contact 680 on the wireless host device 650, a bind operation is initiated. Because when the connector or contact 640 and 680 are in contact they have a conductive path through them, both unidirectional and/or bi-directional communication may occur between the peripheral 610 and host 650. The first connector or contact 640 and the second connector or contact 680 may form a single conductive path or may form a plurality of conductive paths, and may communicate using a serial interface (for example the well known I2C interface, or a serial interface) or a parallel interface, or even a single wire interface.

Figure 7:
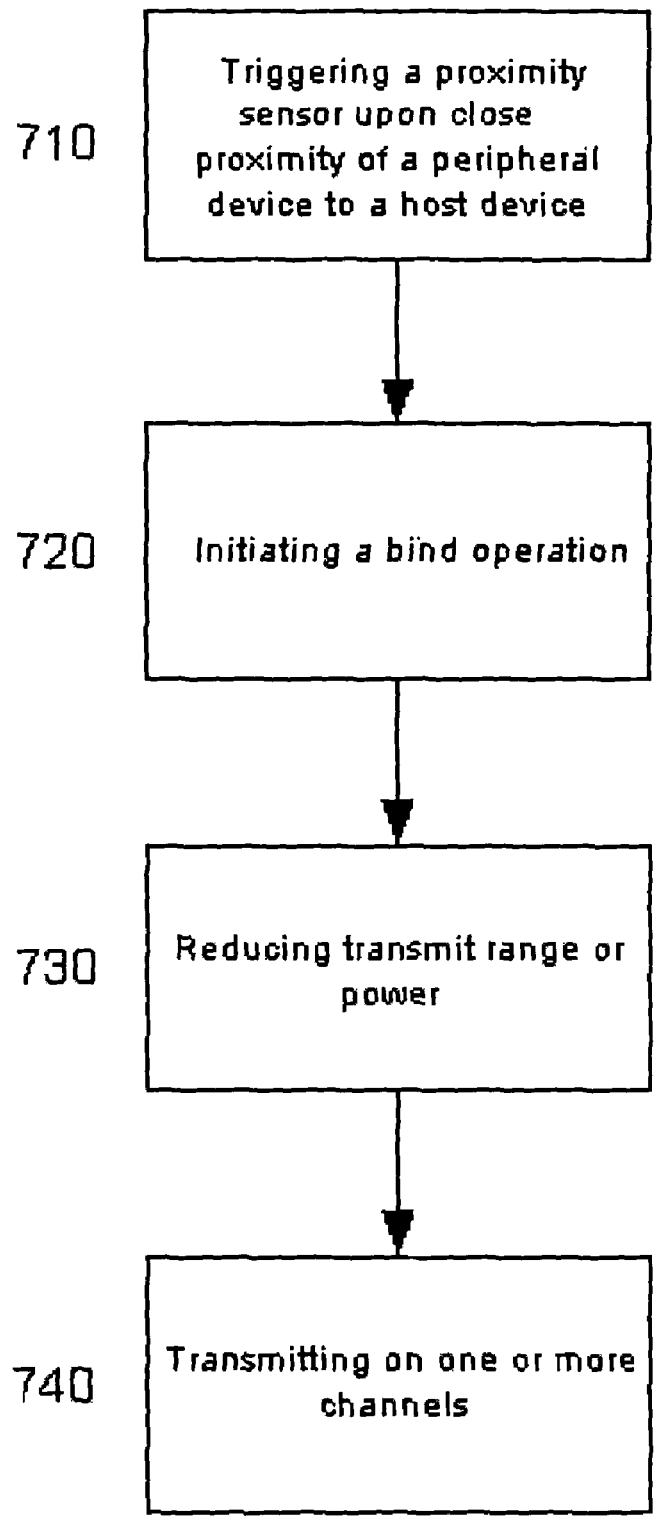
FIG. 7 illustrates an improved method of binding a wireless peripheral device to a wireless host.

An improved method 700 of binding a wireless peripheral device 300 to a wireless host device 400 is shown in FIG. 7. A first step 710 triggering a proximity sensor 310 on close proximity of the peripheral device 300 to the host device 400. A second step 720 comprises initiating a bind operation by the peripheral device 300 to the host device 400. A third optional step 730 may comprise reducing the transmission range or transmission power of the transmit circuit 320. A fourth step 740 comprises transmitting a bind message on one or more channels, where the data to be transmitted may comprise one or more pseudorandom number (PN) codes.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity, many of the details of the improved solution and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A peripheral device, comprising:
    a proximity sensor configured to:
        detect that the peripheral device is within a selected proximity range of a host device in response to sensing a proximity sensor activator of the host device, and
        signal the peripheral device to operate in a pairing mode, based on the detection;
    a bind logic circuit coupled to the proximity sensor, the bind logic circuit being configured to provide a bind request when the peripheral device is operating in the pairing mode; and
    a transmitter coupled to the proximity sensor and to the bind logic circuit, and configured to repeatedly transmit the bind request to the host device over at least one pairing channel, the bind request transmitted to the host device including a data channel identifier to direct the host device to a data channel to be used for a later transmission of data from the peripheral device to the host device, wherein a transmit power of the transmitter is reduced when the peripheral device enters the pairing mode to transmit the bind request within a reduced communication range.

2. The peripheral device of claim 1, wherein the proximity sensor is a hall effect sensor.

3. The peripheral device of claim 1, wherein the proximity sensor is an optical sensor.

4. The peripheral device of claim 1, where the peripheral device comprises a human interface device.

5. The peripheral device of claim 1, wherein the peripheral device comprises a transmit only device.

6. The peripheral device of claim 1, wherein the selected proximity range is 3 inches.

7. The peripheral device of claim 1, where the selected proximity range is 24 inches.

8. The peripheral device of claim 1, wherein the bind request comprises signals transmitted over a plurality of channels determined by the bind logic circuit.

9. The peripheral device of claim 1, wherein the bind logic circuit includes pseudorandom number (PN) logic to control a number of PN codes transmitted in the bind request.

10. A wireless system, comprising:
    a peripheral device; and
    a host device including:
        a host receiver configured to receive wireless communications from the peripheral device, and
        a proximity sensor activator, the peripheral device including:
            a proximity sensor configured to be triggered by a signal from the proximity sensor activator when the proximity sensor detects that the peripheral device is located within a selected proximity to the host device,
            a bind logic circuit coupled to the proximity sensor to initiate repeated transmission of a bind mode request from the peripheral device to the host receiver based on the proximity sensor being triggered,
                the bind mode request identifying a communication channel to be used by the peripheral device to communicate data to the host device, and
                the host receiver further configured to receive data from the peripheral device over the communication channel identified in the bind mode request; and
            a transmitter configured to transmit the bind mode request, wherein a transmit power of the transmitter is reduced to transmit the bind request within a reduced communication range.

11. The wireless system of claim 10, wherein the proximity sensor activator is configured to output a pulsed signal.

12. The wireless system of claim 10, wherein the host device comprises a personal computer.

13. The wireless system of claim 10, wherein the host device comprises an entertainment device.

14. The wireless system of claim 10, wherein the host device comprises a control device.

15. The wireless system of claim 10, wherein the proximity sensor activator is located in a dongle.

16. The wireless system of claim 10, wherein the host device is configured to reduce a receiving sensitivity in response to the bind mode request.

17. A wireless communication device, comprising:
a proximity sensor configured to detect that the proximity sensor is within a selected proximity range to a host wireless device through a triggering signal from the host wireless device, the triggering signal including a signature of signal patterns;
bind logic coupled to the proximity sensor, the bind logic configured to initiate a bind operation with the host wireless device responsive to receipt by the proximity sensor of the triggering signal; and
a transmitter coupled to the bind logic, the transmitter configured to transmit reduced communication range bind signals repeatedly to the host wireless device during the bind operation, the bind signals identifying a data channel to the host wireless device to be utilized for subsequent data communication from the wireless communication device to the host wireless device.

18. The wireless communication device of claim 17 comprising logic configured to control transmit power of the transmitter.

19. The wireless communication device of claim 17 comprising logic configured to control a number of a plurality of channels on which bind signals are transmitted.

20. The wireless communication device of claim 17 comprising pseudorandom number (PN) logic configured to control a number of PN codes transmitted in the bind signals.

21. The wireless communication device of claim 17, wherein the bind operation does not require user intervention other than a user bringing the wireless communication device and the host device within the selected proximity range.

* * * * *